March 2, 1965  J. A. ROBINSON  3,171,293
POWER PACK UNIT FOR MOTOR VEHICLES OF THE
MINIATURE OR "KART" TYPE
Filed Aug. 25, 1961  5 Sheets-Sheet 1
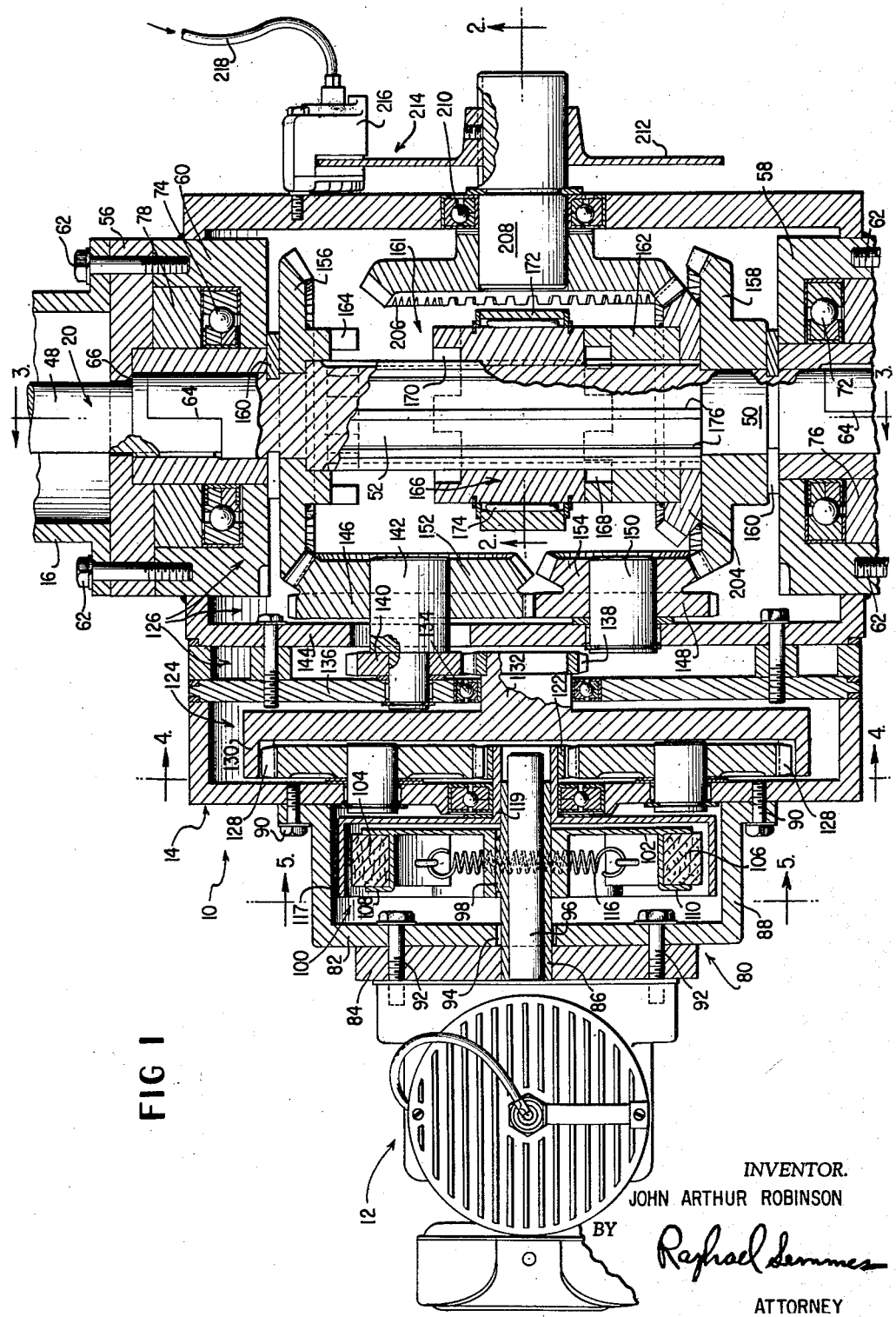
FIG I
INVENTOR.
JOHN ARTHUR ROBINSON
BY Raphael Semmes
ATTORNEY March 2, 1965

J. A. ROBINSON 3,171,293

POWER PACK UNIT FOR MOTOR VEHICLES OF THE MINIATURE OR "KART" TYPE

Filed Aug. 25, 1961

INVENTOR.
JOHN ARTHUR ROBINSON

BY Raphael Semmes

ATTORNEY

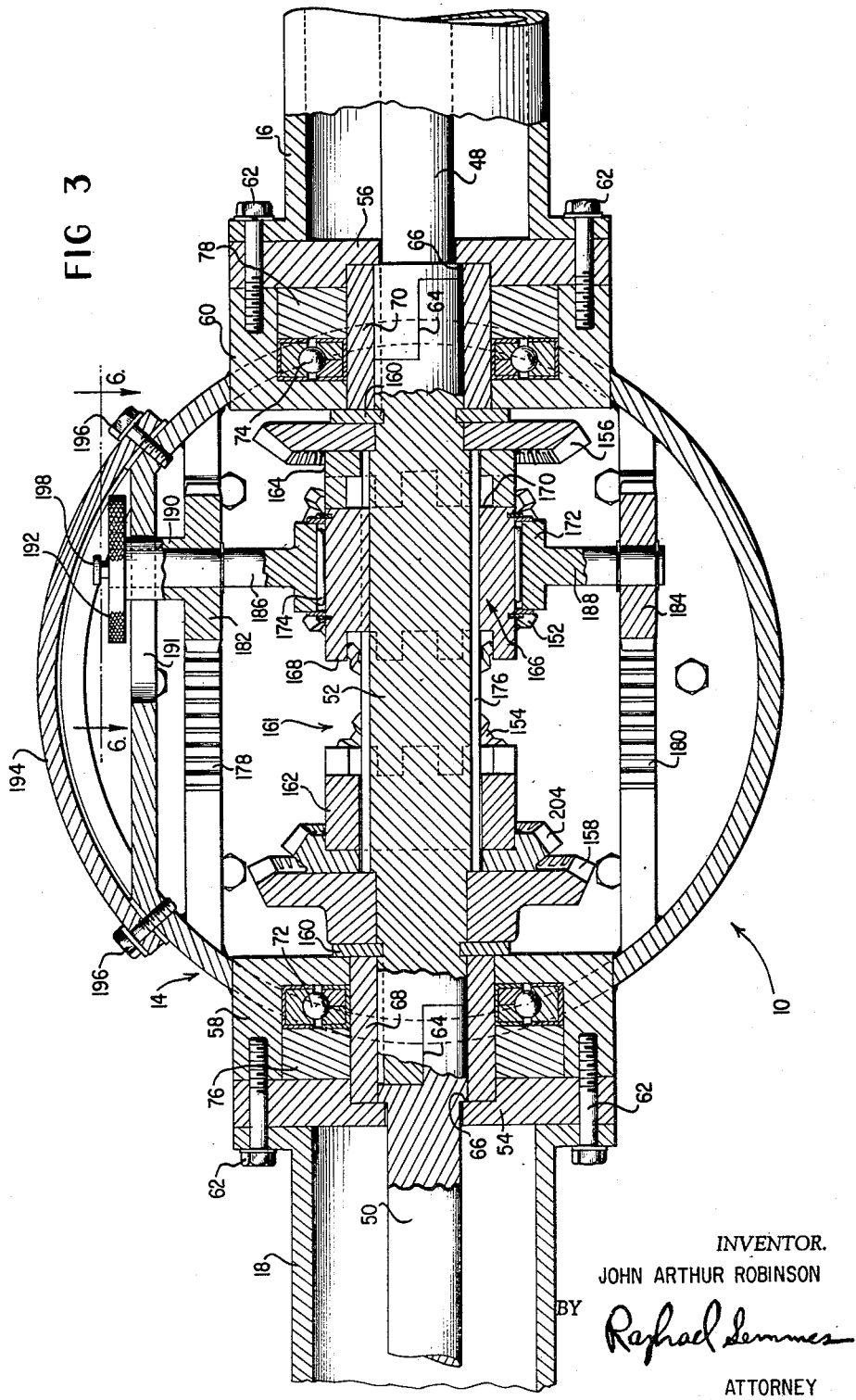

March 2, 1965     J. A. ROBINSON     3,171,293
POWER PACK UNIT FOR MOTOR VEHICLES OF THE
MINIATURE OR "KART" TYPE Filed Aug. 25, 1961     5 Sheets-Sheet 4

INVENTOR.
JOHN ARTHUR ROBINSON
BY
*Raphael Semmes*
ATTORNEY

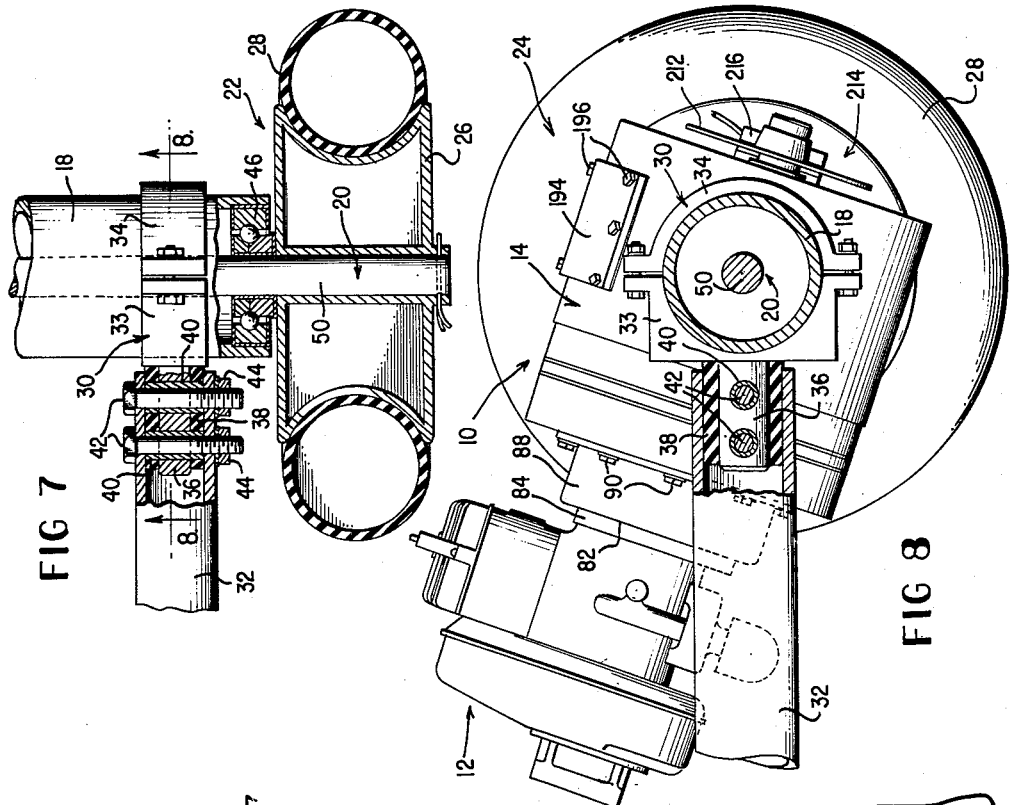

United States Patent Office 3,171,293
Patented Mar. 2, 1965

3,171,293
POWER PACK UNIT FOR MOTOR VEHICLES OF THE MINIATURE OR "KART" TYPE
John A. Robinson, Maynard Brook Farm, Pawlet, Vt.
Filed Aug. 25, 1961, Ser. No. 133,964
21 Claims. (Cl. 74—373)

This invention relates to power packs for motor vehicles of the "kart" type, and more particularly to a self-contained, self-supporting unit, which may be readily attached to the chassis of such a vehicle, which supports a readily interchangeable gasoline engine, and which provides a complete drive train for the rear wheels of the vehicle.

A "kart" may be defined generally, but not restrictively, as a small 4-wheel land vehicle having a low-slung frame or chassis with the front wheels steerable and the rear wheels driven by an air-cooled gasoline engine mounted behind the driver's seat. Such a vehicle is usually characterized by its simplicity, most of the parts being exposed.

"Kart" type motor vehicles, which have come to be called simply "karts," are becoming increasingly popular in racing competition. Associations have been formed to promote such competition and to promulgate and enforce prescribed regulations and formulae for the construction and usage of "karts" in racing. Different classes of racing competition have been established in accordance with the power developed by the vehicles. A "kart" may be entered in more than one class by providing the chassis with an appropriate power unit. Heretofore, a change in competition class has been effected by dismantling of the vehicle engine from a flat-bed mounting and replacement of the engine by one of higher or lower range, together with a change of rear axle chain sprocket and/or clutch. While the procedure has been somewhat simplified by the introduction of detachable axle-mounted units, comprising an axle, engine, and sprockets, etc., a change of class has remained an expensive and time-consuming procedure. It has been necessary to have available a complete matching assembly for attachment to the "kart" body for each of the classes of competition which it is desired to enter. It is accordingly a principal object of the present invention to provide a power pack unit for a motor vehicle of the "kart" type which permits expeditious attachment and detachment of any one of a wide variety of engines, and which provides a complete drive train (including clutch, variable gear train, brake, and rear axle).

A further object of the invention is to provide a unique adapter assembly and method which promotes rapid interchangeability of engines.

Another object of the invention is to provide a unique power pack unit which may be rapidly installed, which eliminates the need for separate transmission gearing, separate wheel brakes, or rear axle springs, and which permits the selection of a desired angle of engine inclination.

Still another object of the invention is to provide a unique gear train for use in a vehicle power pack and the like.

Yet another object of the invention is to provide a unique arrangement for shifting the effective ratio of a gear train for such a power pack and the like.

A further object of the invention is to provide a unique braking arrangement for use in such a power pack and the like.

Briefly stated, and without limitation, the present invention is concerned with a power pack unit for "karts," the unit having a housing which may be readily mounted upon the vehicle chassis, and the housing containing a centrifugal clutch which drives a gear train, which drives a rear axle, the central portion of which is associated with means for shifting the gear ratio and for braking the gear train. An adapter assembly is provided for each of the engines to be utilized and permits rapid mounting of the engine and coupling of the engine drive shaft to the clutch.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein:

FIGURE 1 is a horizontal sectional view of the power pack unit of the invention shown in association with a typical engine;

FIGURE 3 is a vertical sectional view taken along line 3—3 of FIGURE 1 in the direction of the front of the unit and illustrates details of the gear train and axle;

FIGURE 6 is a fragmentary horizontal sectional view taken along line 6—6 of FIGURE 3 and illustrates details of the gear shifting mechanism;

FIGURE 7 is a fragmentary horizontal sectional view showing the left rear wheel and the manner in which the power pack unit is mounted upon the vehicle chassis;

FIGURE 8 is a vertical sectional view taken along line 8—8 of FIGURE 7 and illustrates the power pack unit with the engine attached and the manner in which the unit is mounted upon the vehicle chassis and oriented;

FIGURE 9 is a vertical sectional view illustrating an alternative form of brake which may be employed in the invention.

Figure 10:
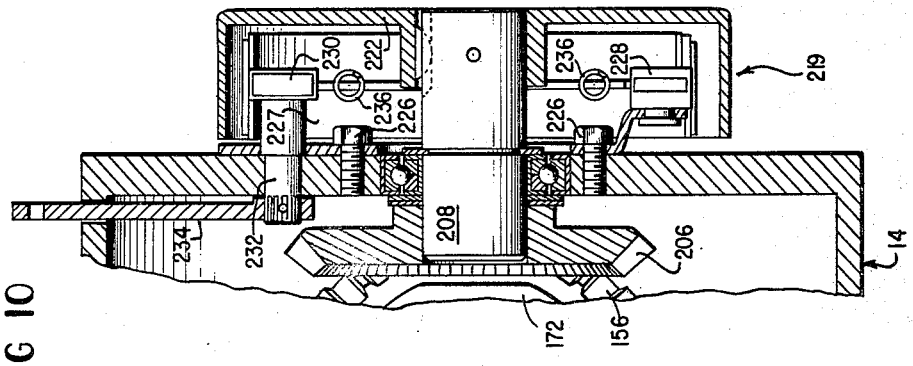
FIGURE 10 is a fragmentary sectional view taken along line 10—10 of FIGURE 9 showing further details of the brake.

Referring to the drawings, and initially to FIGURES 1 and 8 thereof, the power pack 10 of the invention is shown in association with a typical air-cooled gasoline engine 12. The power pack comprises a housing 14 (of aluminum, for example) having axle housing portions 16 and 18 from which extend the ends of the rear axle 20. Conventional wheels 22 and 24 (FIGS. 7 and 8) including hubs 26 and tires 28 are fixed to the projecting extremities of the axle in any conventional manner, such as keying. In the form shown, bayonet type clamping members 30 are employed to mount the axle housing (and hence as will appear hereinafter the entire power pack unit) upon the rear extremity of the longitudinal tubular rails 32 of the "kart" chassis. The remainder of the "kart" chassis construction is conventional and well known and hence will not be described. Each clamp comprises a pair of C-shaped members 33, 34 which embrace the axle housing and are bolted together as shown, there being sufficient space between the members to permit a strong grip upon the axle housing when the bolts are tightened. The longitudinal axis of the power pack and engine may be inclined at any angle from say zero to forty-five degrees to the horizontal by selecting the desired orientation prior to tightening of the clamps. Each clamp has a lug 36 extending from one of the C members into the associated tubular rail 32, the lug being surrounded by a rubber bushing 38 which takes up the space between the lug and the rail. Sleeves 40 extend transversly through suitable bores in the lug and the bushing and accommodate bolts 42, which pass through aligned bores in the rails 32 to receive nuts 44.

The outer extremity of each axle housing is provided with a suitable bearing 46 (FIG. 7) for rotatably supporting the axle 20. As shown in FIGURES 1 and 3, the axle 20 has outer portions 48 and 50 which extend through the axle housings 16 and 18, respectively, and a central portion 52. The outer portions pass through cover plates 54 and 56 which with housings 16 and 18 are fixed to cups 58 and 60 by bolts 62 passing through the cover plates and flanges of the axle housings. The outer axle portions may be separable from the central portion but are formed to interlock therewith, as shown by the mating steps at 64, so that the axle turns as a unit. The outer axle portions may be undercut as shown at 66 for retention by plates 54 and 56. Bushings 68 and 70 are splined or keyed to the axle and are in turn supported for rotation by axle bearings 72 and 74. Fiber spacer washers 76 and 78 take up the space between the bearings and the cover plates 54 and 56. Cups 58 and 60 may be welded to the housing 14 so as to form a part thereof. The manner in which the axle is driven will be described later.

Referring to FIGURE 1, an important feature of the invention is an adapter assembly 80 which permits the mounting of any of the available air-cooled gasoline engines upon the power pack housing and which permits the coupling of the drive shaft of such an engine to the drive train within the housing. In accordance with the invention, the adapter assembly comprises a mounting plate 82, a spacer 84 (preferably fiber), and a bushing 86. In the form shown the plate 82 is part of a housing 88 for a clutch to be described. The plate has a standardized circular array of bolt holes for receiving bolts 90 which mount the plate upon the power pack housing 14. This bolt hole arrangement is standardized, because the power pack housing remains the same (and hence its bolt hole arrangement remains the same) regardless of the engine employed. The plate 82 has a second bolt hole arrangement for receiving bolts 92 utilized to mount the selected engine 12 upon the plate. This hole arrangement varies with the engine and is chosen to match the hole arrangement on the casing of the engine to be employed. The arrangement of holes through the spacer 84 conforms to the last-mentioned arrangement.

Figure 5:
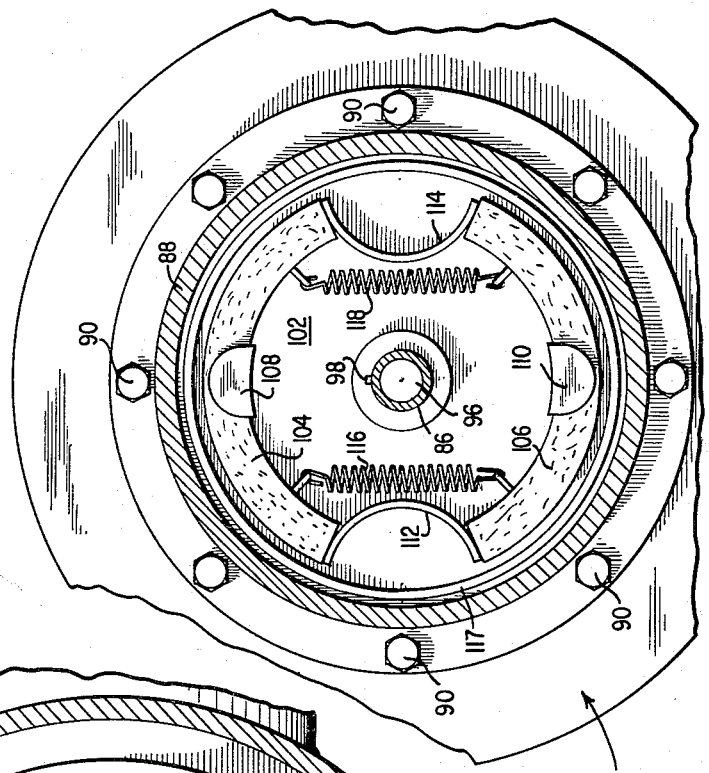
FIGURE 5 is a sectional view taken along line 5—5 of FIGURE 1 and illustrates clutch details.

Plate 82 has an opening 94 through which pass the drive shaft 96 of the engine and the bushing 86 coaxially, there being an aligned opening in spacer 84. The outer configuration of the bushing is standardized to conform to the input of the drive train within the power pack, and the bushing may be provided with a key 98 as shown in FIGURES 1 and 5 to couple it to the input of the clutch to be described. The inner configuration of the bushing conforms to the outer configuraion of the drive shaft 96 of the engine with which it is employed.

It is proposed to provide a plate 82, a spacer 84, and a bushing 86 for association with each of the engines to be utilized with the power pack. These elements may be permanently affixed to the engine, so that the coupling of the engine to the power pack simply involves the placement of the bolts 90 and the insertion of the bushing and drive shaft into the power pack. This may be accomplished very quickly. Variation in length, width, and taper of the engine drive shaft is accommodated by variation of the length and inside configuration of the bushing and by variation of the length of the plate 82 (that is, the distance between the holes for the bolts 90 and the holes for the bolts 92). Variation of the engine mounting hole arrangement is accommodated by the arrangement of the mounting holes for the bolts 92 in the plate 82 and the spacer 84. Variation of the configuration of the engine crank case is accommodated by a mating configuration of the spacer 84 to suit the engine involved. The manner of affixing the bushing 86 to the drive shaft 96 depends upon the type of drive shaft—splines, keys, and the like being accommodated by the inner configuration of the bushing.

A single adapter plate and spacer may be constructed to accommodate any one of a plurality of different engines by providing several hole arrangements for bolts 92 or by providing holes which are elongated slots, so as to permit different portions of the slots to be utilized for different engines. The holes or slots can be identified by symbols, and instruction sheets can be issued to designate the holes or slot portions to be used with different engines.

In accordance with the preferred form of the invention, the selected engine is coupled to the driving element of a clutch 100, which may be a centrifugal clutch of the type manufactured by Fairbanks, Morse & Co., of Beloit, Wisconsin. As shown in FIGURES 1 and 5, the bushing 86 may be keyed to the hub of a clutch shoe supporting disc 102, on which are mounted expanding clutch shoes 104 and 106 as by suitable guiding and stop elements 108, 110, 112, and 114. Springs 116 and 118 are employed to maintain the clutch shoes in their retracted positions. When the drive shaft of the engine turns at a predetermined r.p.m., say 2400 r.p.m., the shoes move outwardly into engagement with the rim of a clutch drum 117 having a sleeve extension 119 (FIG. 1) surrounding the end of the bushing 86 and mounted in bearing 120 upon the housing 14.

Figure 4:
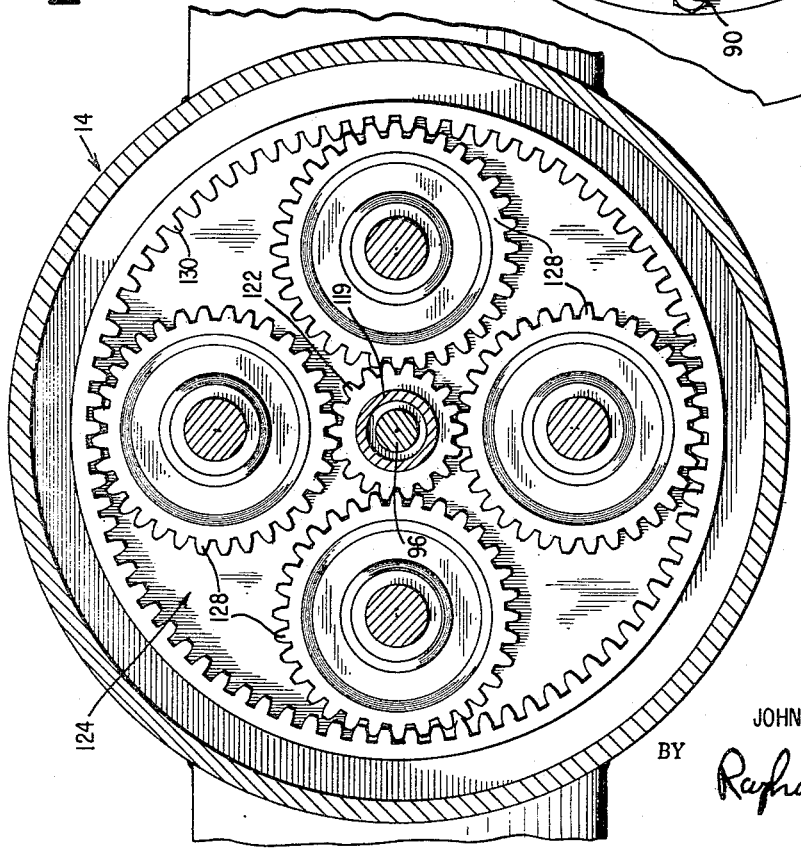
FIGURE 4 is a sectional view taken along line 4—4 of FIGURE 1 and illustrates primary gearing.

On the end of the sleeve 119 is fixed a spur gear 122 which may be integral with the sleeve and which constitutes the input gear of a gear train including primary gearing generally designated 124 and secondary gearing generally designated 126. Gear 122 drives a plurality of intermediate spur gears 128 (see FIG. 4) rotatably mounted on the housing and which in turn drive a ring gear 130. The ring gear has a hub 132 supported in a bearing 134 on a septum 136 in the housing 14. This hub has a spur gear 138 fixed thereto which drives another spur gear 140 rotatably mounted on the septum. The shaft 142 on which the gear 140 is fixed passes through an opening in another septum 144 and has a further spur gear 146 fixed thereto. This spur gear meshes with another spur gear 148 fixed to a shaft 150 rotatably mounted on the septum 144. Gears 146 and 148 have preferably integral therewith a pair of bevel gears 152 and 154, respectively. These bevel gears drive associated output bevel gears 156 and 158, respectively, which are rotatable upon the axle 20. Gears 156 and 158 are held in place by snap retainer rings 160. As will appear hereinafter, either of gears 156 or 158 may be coupled to the axle, selectively, so as to drive the same.

The gear train, or specifically the secondary gearing, is provided with means for changing its effective reduction ratio. This means comprises a shifting mechanism which permits one or the other of output gears 156 and 158 to be coupled to the axle. Gear 156 is driven from gear 138 through gear 140 and gear 152. Gear 158 is driven from gear 138 through gear 140, gear 146, gear 148 and 154. The two gear trains from gear 138 to gears 156 and 158, respectively, have different ratios. In a practical embodiment the arrangement is such that the two secondary gear reduction ratios are 6.9 to 1 and 7.9 to 1, the primary gear reduction ratio being 5.3 to 1.

Figure 2:
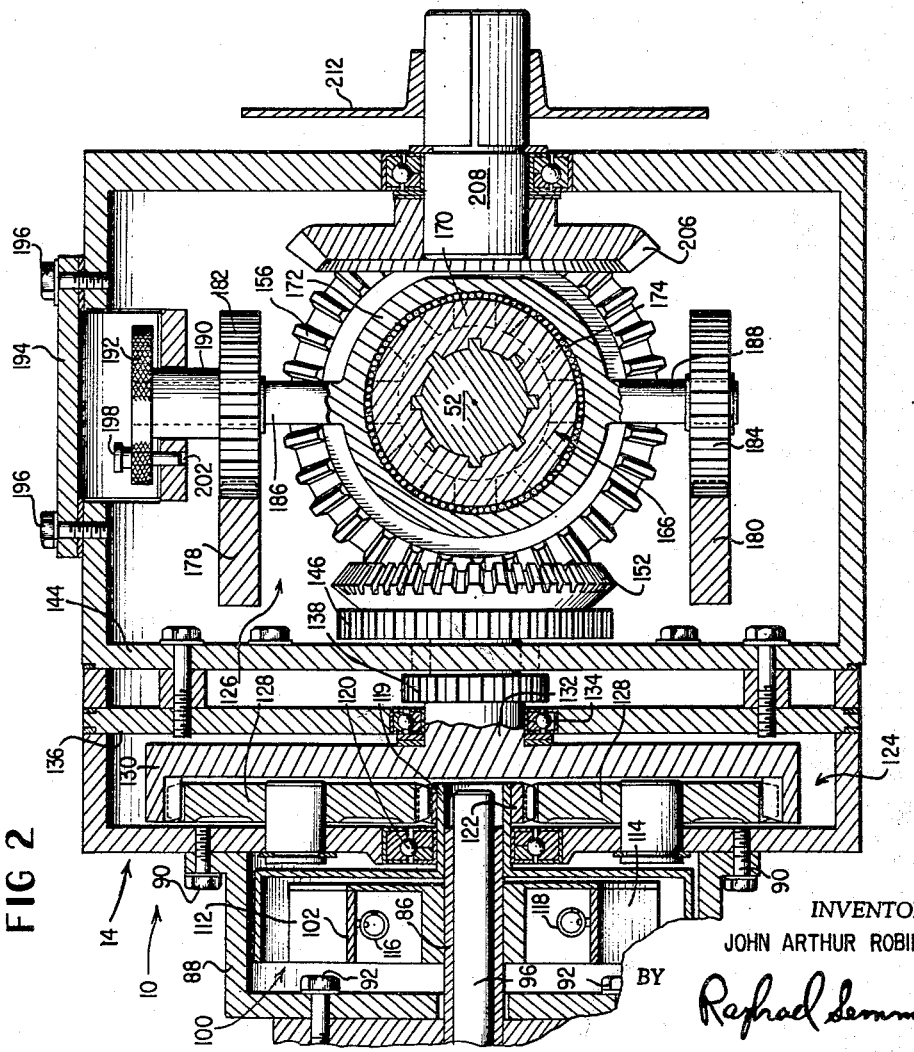
FIGURE 2 is a vertical sectional view taken along line 2—2 of FIGURE 1 in the direction of the right rear wheel and illustrates details of the clutch, gear train, and brake.

In the form shown, the ratio selecting or gear shifting means comprises a clutch 161 best seen in FIGURES 1, 2, and 3. As shown in FIGURES 1 and 3, each of the gears 156 and 158 has a dog clutch ring 162 or 164 fixed thereto and rotatable therewith. A slider 166 movable along the central portion 52 of the axle has a pair of mating dog clutch rings 168 and 170. As shown in FIGURE 2, the slider body is a ring 172 supporting needle bearings 174. The outer bearing race is attached to the ring, and the inner bearing race is attached to (preferably integral with) the clutch rings 168 and 170. The inner race is serrated to mate with splines 176 extending along the length of the central axle portion 52. The clutch rings 168 and 170 thus turn with the axle within the ring 172 of the slider. If the slider is shifted to engage clutch rings 162 and 168, then gear 158 drives the axle, while if the slider is shifted to engage clutch plates 164 and 170, then gear 156 drives the axle.

In accordance with the preferred form of the invention, the slider is shifted by a manually operated rack and pinion mechanism. As shown in FIGURES 2 and 3, a pair of racks 178 and 180 is mounted in the housing 14, the racks being arranged parallel to the axle above and below the same, respectively. Each rack has a pinion 182 or 184. The pinions are mounted for rotation on the shafts 186 and 188, respectively, which are preferably integral with the ring 172 of the slider. Pinion 182 is fixed to or integral with a sleeve 190 which turns with the pinion upon the end of shaft 186, the upper extremity of the sleeve extending through a slot 191 in the housing to a knurled knob 192 fixed thereto for turning the sleeve and the pinion 182. A removable cover plate 194 is secured to the housing by bolts 196 and permits access to the knob 192. When the knob is turned, pinion 182 turns and moves along rack 178, carrying with it shaft 186, the slider, shaft 188, and pinion 184, which moves along rack 180. The slider may be locked into either of its extreme positions by a pin 198 which passes through either of two prelocated openings 200 or 202 (see FIGURES 2 and 6). It is thus apparent that the effective gear reduction ratio of the power pack unit of the invention may be quickly changed from one value to another. This will usually be done concurrently with a change of engine.

The power pack of the invention incorporates a brake which is effective to impede the movement of both rear wheels, one form of brake being illustrated in FIGURE 1, and an alternative form in FIGURES 9 and 10. Referring to FIGURE 1, gear 158 has another bevel gear 204 fixed thereto. This gear meshes with another bevel gear 206 fixed to a shaft 208 perpendicular to the axle, the shaft being rotatable in a bearing 210 on the end of the housing 14. Shaft 208 supports the disc 212 of a spot brake 214 having a caliper unit 216 mounted upon the end wall of the housing and driven from a suitable hydraulic supply, one of the supply lines being shown at 218. Such a brake is well known and may be of the type manufactured and sold by Airheart Products Inc., Van Nuys, California. It will be observed that when the brake is actuated so as to impede the movement of the disc 212, the braking action is transmitted to the gear 206 and then to gears 204, 158, 154, 148, and 146. Since gears 204 and 206 are always in mesh, it is immaterial which of gears 156 and 158 is coupled to the axle, because both of the driving gears 146 and 148 are subjected to the braking action.

In the modified form of brake 219 shown in FIGURES 9 and 10, shaft 208 is keyed at 220 to the drum 222 of the brake, which may be of the type sold by The Bendix Corp., South Bend, Indiana. The brake shoe supporting plate 224 is mounted on the end of the housing as by screws 226. The shoes 227 are expanded outwardly about an anchor pin 228 by an actuating cam 230 on the end of a stub shaft 232 turned by lever 234 extending through a slot in housing 14. Shoe return springs are shown at 236 and shoe retainer springs at 238. Again, the braking action is transmitted through shaft 208 and gear 206 to the gear train.

Regardless of which type of brake is used, the location of the brake at the rear of the unit and its accessibility make possible short, direct brake controls and simple repair procedures.

It is apparent that the present invention provides a power pack unit for a "kart" type vehicle and the like containing a complete drive train. The power pack may be attached to the "kart" in a very simple manner and permits interchangeability of engines expeditiously, as well as choice of engine inclination. The engine and power pack when bolted together form an integral self-supporting and self-contained unit. Separate transmission gearing is unnecessary, because a multiple ratio gear train is provided. Differential gearing is not used, and the axle housing and wheels are unsprung. A single brake serves both rear wheels. Chain sprockets, conventional engine mounting brackets, and external clutches are eliminated. Moreover, the power pack unit serves to lower the center of gravity and to lower the weight of the vehicle on a power-to-weight basis.

While preferred embodiments of the invention have been shown and described, it will be apparent to those skilled in the art that changes can be made in these embodiments without departing from the principles and spirit of the invention, the scope of which is defined in the appended claims. For example, with engines such as the Engray, in which the drive shaft is perpendicular to the engine mounting bolts, a base plate perpendicular to adapter plate 82 may be used to support the engine. The base plate may have slotted holes to accommodate different engine bolt hole arrangements and may be fixed to the adapter plate by means of a flange juxtaposed with the mounting plate and secured thereto by bolts through slotted holes. Accordingly, the foregoing embodiments are to be considered illustrative, rather than restrictive of the invention, and those modifications which come within the meaning and range of equivalency of the claims are to be included therein.

The invention claimed is:

1. An adapter assembly for permitting the mounting of an engine upon a "kart" type motor vehicle and the like and coupling the engine to the vehicle drive train, said assembly comprising a plate having means for mounting the same on the vehicle, mounting means on said plate arranged to fix an engine thereto, and a bushing for receiving the drive shaft of said engine, said bushing having a standardized external configuration fitting a portion of said drive train and having an internal configuration fitting said drive shaft.

2. The invention of claim 1, said plate having an opening through which said bushing and said drive shaft pass.

3. The invention of claim 1, said assembly having a spacer interposed between said plate and the casing of said engine.

4. A power pack unit for a motor vehicle of the "kart" type and the like, comprising a housing having therein a centrifugal clutch with a driving element and a driven element, said driving element being adapted for connection to the drive shaft of an engine, a gear train with an input and an output, said input being connected to the driven element of said clutch, an axle connected to the output of said gear train, means for changing the effective ratio of said gear train, and an adapter assembly adjacent the clutch having means for receiving and mounting interchangeably any one of a plurality of different engines upon said housing and means for coupling the drive shaft of the selected engine to the driving element of the clutch.

5. The invention of claim 4, further comprising brake means for impeding the movement of said gear train.

6. A power pack unit for a motor vehicle of the "kart" type and the like, comprising a housing having therein a centrifugal clutch with a driving element and a driven element, said driving element being adapted for connection to the drive shaft of an engine, a gear train with an input and an output, said input being connected to the driven element of said clutch, an axle connected to the output of said gear train, means for changing the effective ratio of said gear train, and clamp means for supporting said housing on the chassis of the vehicle, said clamp means being adjustable to permit adjusting the inclination of the power pack unit.

7. A power pack unit for a motor vehicle of the "kart" type and the like, comprising a housing having therein a centrifugal clutch with a driving element and a driven element, said driving element being adapted for connection to the drive shaft of an engine, a gear train with an input and an output, said input being connected to the driven element of said clutch, an axle connected to the output of said gear train, and means for changing the effective ratio of said gear train, said axle comprising a pair of outer parts and a central part, said gear ratio changing means comprising means movable along the central part of said axle.

8. The invention of claim 7, said gear ratio changing means comprising a clutch having a part rotatable with and slidable along said central axle part.

9. The invention of claim 8, said gear ratio changing means further comprising a rack and a pinion movable along said rack and connected to said slidable clutch part, and means for moving said pinion along said rack manually.

10. In a power pack unit for a motor vehicle of the "kart" type and the like, an axle having a pair of outer parts and a central part, a pair of spaced gears rotatable on said central part, drive means for turning said gears, and clutch means having a clutch part coupled to said central axle part of rotation therewith and having clutch parts affixed to the respective gears, the first-mentioned clutch part being supported for reciprocation along said central axle part to engage the last-mentioned clutch parts selectively.

11. The invention of claim 10, further comprising a rack and a pinion for moving said reciprocable clutch part along said central axle part, said rack being fixed parallel to said axle, and said pinion moving along said rack and being connected to said reciprocable clutch part.

12. The invention of claim 10, said pair of gears and said drive means forming a gear train which includes an additional gear having brake means for impeding its movement.

13. The invention of claim 10, said first-mentioned clutch part being part of a slider having bearings for supporting that clutch part rotatably, said slider having a pair of shafts extending therefrom perpendicular to said axle, each of said shafts having a pinion thereon, a pair of fixed racks associated with said pinions, respectively, said racks being arranged parallel to said axle, and means for turning said pinions for causing them to move along said racks and for causing said slider to move along said axle, the last-mentioned means comprising a manually engageable element having means for locking the position of said slider.

14. The invention of claim 10, the outer parts of said axle being separable from the central portion.

15. In a power pack unit for a motor vehicle of the "kart" type and the like, an axle having a pair of spaced bevel gears mounted for rotation thereon, second pair of bevel gears meshed with the respective gears of the first-mentioned pair, gear means for driving said second pair of bevel gears concurrently, and an additional bevel gear meshed with one of the gears of the first pair, said additional bevel gear having brake means for impeding its movement.

16. The invention of claim 15, further comprising clutch means for coupling one or the other of the bevel gears of the first pair to said axle for rotation therewith.

17. A power pack unit for a motor vehicle of the "kart" type and the like, comprising a housing, means for mounting said housing on the chassis of said vehicle, an adapter assembly associated with said housing and having mounting means for accommodating a selected one of a plurality of different engines, a centrifugal clutch in said housing having a driving element and a driven element, said adapter assembly having a bushing fitting the drive shaft of the selected engine and coupling said shaft to the driving element of the clutch, a gear train in said housing having an input gear and a pair of output gears, said input gear being connected to the driven element of said clutch, an axle having its ends extending from said housing and having a central portion within said housing, said pair of output gears being mounted in spaced relation upon said central axle portion and being rotatable with respect thereto, said gear train having intermediate gears driving said output gears, shiftable means for connecting said output gears to said axle for rotation therewith selectively, and brake means for impeding the movement of said gear train.

18. The invention of claim 17, said shiftable means comprising a clutch having elements connected to said output gears, respectively, and an element rotatable with said axle and engageable with either of the clutch elements associated with said gears, respectively.

19. Apparatus for mounting a selected one of a plurality of engines upon a "kart" type motor vehicle and the like and for coupling the engine to the drive train of the vehicle, comprising in association with each of said engines a plate having a standardized arrangement of bolt bores for receiving bolts to mount said plate on the vehicle and having a second arrangement of bolt bores conforming to the arrangement of bolt bores in the engine casing for receiving bolts for attaching the plate to the engine casing, a spacer adapted to be received between the plate and the engine casing, and a bushing having an inner configuration fitting the configuration of the drive shaft of the engine and a standardized outer configuration fitting an input member of the drive train.

20. A power pack unit for a motor vehicle of the "kart" type and the like, comprising a housing having a rotatable axle extending therefrom and containing a drive train for said axle, said housing having means for detachably supporting a selected one of a plurality of different engines thereon and having means for attaching the housing to the vehicle chassis with said axle positioned to drive and support said vehicle, and means for coupling the selected engine to said drive train, the last-mentioned means comprising a removable element fitting the drive shaft of said engine to said drive train.

21. The invention of claim 20, said drive train comprising a variable ratio gear train.

References Cited by the Examiner
UNITED STATES PATENTS

| | | | |
|---|---|---|---|
| 894,060 | 7/08 | Ruemelin | 180—59 |
| 2,086,809 | 7/37 | Kreis | 74—372 |
| 2,751,029 | 6/56 | Dixon | 74—372 |
| 2,848,055 | 8/58 | Toulmin | 180—62 |
| 2,868,031 | 1/59 | Schumb | 74—606 |

DON A. WAITE, *Primary Examiner.*

BROUGHTON G. DURHAM, *Examiner.*